United States Patent
Wang et al.

(10) Patent No.: US 10,240,506 B2
(45) Date of Patent: Mar. 26, 2019

(54) ESTIMATING NITROGEN OXIDE VALUES FOR VEHICLES

(71) Applicant: GM GLOBAL TECHNOLOGY OPERATIONS LLC, Detroit, MI (US)

(72) Inventors: Yue-Yun Wang, Troy, MI (US); Gongshin Qi, Troy, MI (US); Guiseppe Mazzara Bologna, Nicosia (EN) (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 69 days.

(21) Appl. No.: 15/372,503

(22) Filed: Dec. 8, 2016

(65) Prior Publication Data

US 2018/0163604 A1    Jun. 14, 2018

(51) Int. Cl.
| | | |
|---|---|---|
| *F01N 3/00* | (2006.01) | |
| *F01N 9/00* | (2006.01) | |
| *F01N 3/20* | (2006.01) | |
| *F01N 11/00* | (2006.01) | |

(52) U.S. Cl.
CPC ............. *F01N 9/005* (2013.01); *F01N 3/208* (2013.01); *F01N 3/2066* (2013.01); *F01N 11/00* (2013.01); *F01N 2560/026* (2013.01); *F01N 2610/02* (2013.01); *F01N 2900/0601* (2013.01); *F01N 2900/1402* (2013.01); *Y02A 50/2325* (2018.01); *Y02T 10/24* (2013.01); *Y02T 10/47* (2013.01)

(58) Field of Classification Search
CPC ........... F01N 2560/021; F01N 2610/02; F01N 3/208; F01N 2570/14; B01D 2251/2062; F02D 2041/1433; F23N 1/022
See application file for complete search history.

(56) References Cited

U.S. PATENT DOCUMENTS

| | | | | |
|---|---|---|---|---|
| 8,453,431 | B2 * | 6/2013 | Wang | F02D 41/00 60/285 |
| 8,453,434 | B2 * | 6/2013 | Yacoub | F01N 3/208 60/286 |
| 2010/0024389 | A1 * | 2/2010 | Gady | B01D 53/30 60/274 |
| 2014/0165535 | A1 * | 6/2014 | Gonze | F01N 3/0842 60/273 |
| 2017/0022865 | A1 * | 1/2017 | Khaled | F01N 3/2066 |

* cited by examiner

*Primary Examiner* — Audrey K Bradley
*Assistant Examiner* — Anthony Ayala Delgado
(74) *Attorney, Agent, or Firm* — Lorenz & Kopf, LLP

(57) ABSTRACT

Methods, systems, and vehicles are provided for estimating nitrogen oxide values for vehicles. In accordance with one embodiment, a system includes a memory and a processor. The memory is configured to store one or more kinetic models pertaining to a propulsion system for a vehicle. The processor is configured to at least facilitate obtaining a nitrogen value pertaining to a selective catalytic reduction (SCR) unit of the propulsion system, obtaining an initial nitrogen oxide measurement via a nitrogen oxide sensor of the propulsion system, using the nitrogen value as an input for the one or more kinetic models pertaining to the propulsion system, generating a kinetic model output from the one or more kinetic models, and estimating an updated value for the initial nitrogen oxide measurement based on the kinetic model output.

14 Claims, 5 Drawing Sheets

ESTIMATING NITROGEN OXIDE VALUES FOR VEHICLES

TECHNICAL FIELD

The present disclosure generally relates to vehicles, and more particularly relates to estimating nitrogen oxide values for vehicles.

BACKGROUND

Certain vehicles today, for example including certain diesel-fuel vehicles, utilize a selective catalytic reduction (SCR) unit that is coupled, directly or indirectly, to an engine of the vehicle to reduce nitrogen oxides in the exhaust. SCR units generally convert nitrogen oxides (also commonly referred to as $NO_x$) to nitrogen and water, with the assistance of ammonia or urea solution that is injected into the SCR unit. The amount of ammonia or urea solution that is injected is based on a measured amount of nitrogen oxide.

However, nitrogen oxide sensors may have cross sensitivity with ammonia, which may result in difficulty in accurately measuring nitrogen oxide concentration.

Accordingly, it is desirable to provide methods and systems for improved estimation of nitrogen oxide values for vehicles. It is also desirable to provide methods, systems, and vehicles incorporating such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method includes obtaining a nitrogen oxides concentration value pertaining to a selective catalytic reduction (SCR) unit of a propulsion system for a vehicle, using the nitrogen oxides value as an input for one or more kinetic models pertaining to the propulsion system, via a processor, to generate a kinetic model output from the one or more kinetic models, obtaining an initial nitrogen oxide measurement via a nitrogen oxide sensor of the propulsion system, and estimating an updated value for the initial nitrogen oxide measurement, via the processor, based on the kinetic model output.

In accordance with another exemplary embodiment, a system is provided. The system includes a memory and a processor. The memory is configured to store one or more kinetic models pertaining to a propulsion system for a vehicle. The processor is configured to at least facilitate obtaining a nitrogen oxides value pertaining to a selective catalytic reduction (SCR) unit of the propulsion system, obtaining an initial nitrogen oxide measurement via a nitrogen oxide sensor of the propulsion system, using the nitrogen oxides value as an input for the one or more kinetic models pertaining to the propulsion system, to generate a kinetic model output from the one or more kinetic models, and estimating an updated value for the initial nitrogen oxide measurement based on the kinetic model output.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
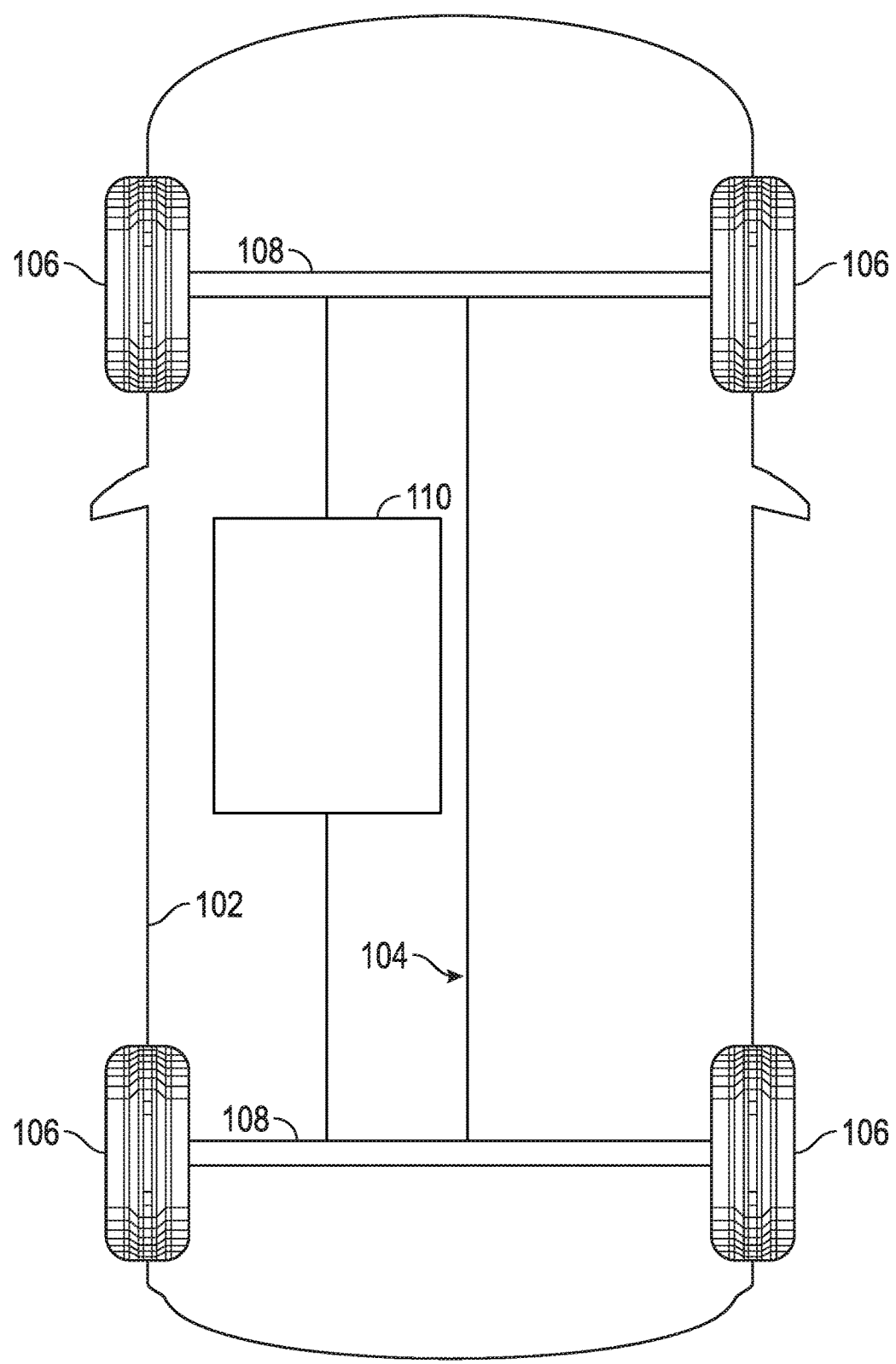
FIG. 1 is a functional block diagram of a vehicle that includes a propulsion system that includes an engine, one or more nitrogen oxide sensors, a selective catalytic reduction (SCR) unit, and a control system, in accordance with an exemplary embodiment.

FIG. 1 illustrates a vehicle 100, according to an exemplary embodiment. The vehicle includes a body 102, a chassis 104, one or more wheels 106, one or more drive shafts (or axles) 108, and a propulsion system 110. In various embodiments the vehicle 100 comprises an automobile; however, this may vary in other embodiments. The vehicle 100 may be any one of a number of different types of automobiles and/or other vehicles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

The body 102 is arranged on the chassis 104 and substantially encloses the other components of the vehicle 100. The body 102 and the chassis 104 may jointly form a frame. The wheels 106 are each rotationally coupled to the chassis 104 near a respective corner of the body 102. In one embodiment, each wheel 106 comprises a wheel assembly that includes a tire as well as a wheel and related components (and that are also collectively referred to as the "wheel 106" for the purposes of this Application). The propulsion system 110 is coupled to at least some of the wheels 106 through one or more drive shafts 108 (or axles), and drives the wheels 106 via the axles 108. While the vehicle 100 is depicted in FIG. 1 as having four wheels 106 and two axles 108, it will be appreciated that in various other embodiments the vehicle 100 may have any number of wheels 106, axles 108, and/or other components.

As described in greater detail further below, the propulsion system 110 includes features for potentially improved estimation of nitrogen oxide for the propulsion system 110, for example as further set forth in the structural diagrams of FIGS. 2-4 for the propulsion system 110 and components thereof, and the flowchart of FIG. 5 for the process 500 for estimation of nitrogen oxide for the propulsion system 110 of the vehicle 100, in accordance with an exemplary embodiment.

Figure 2:
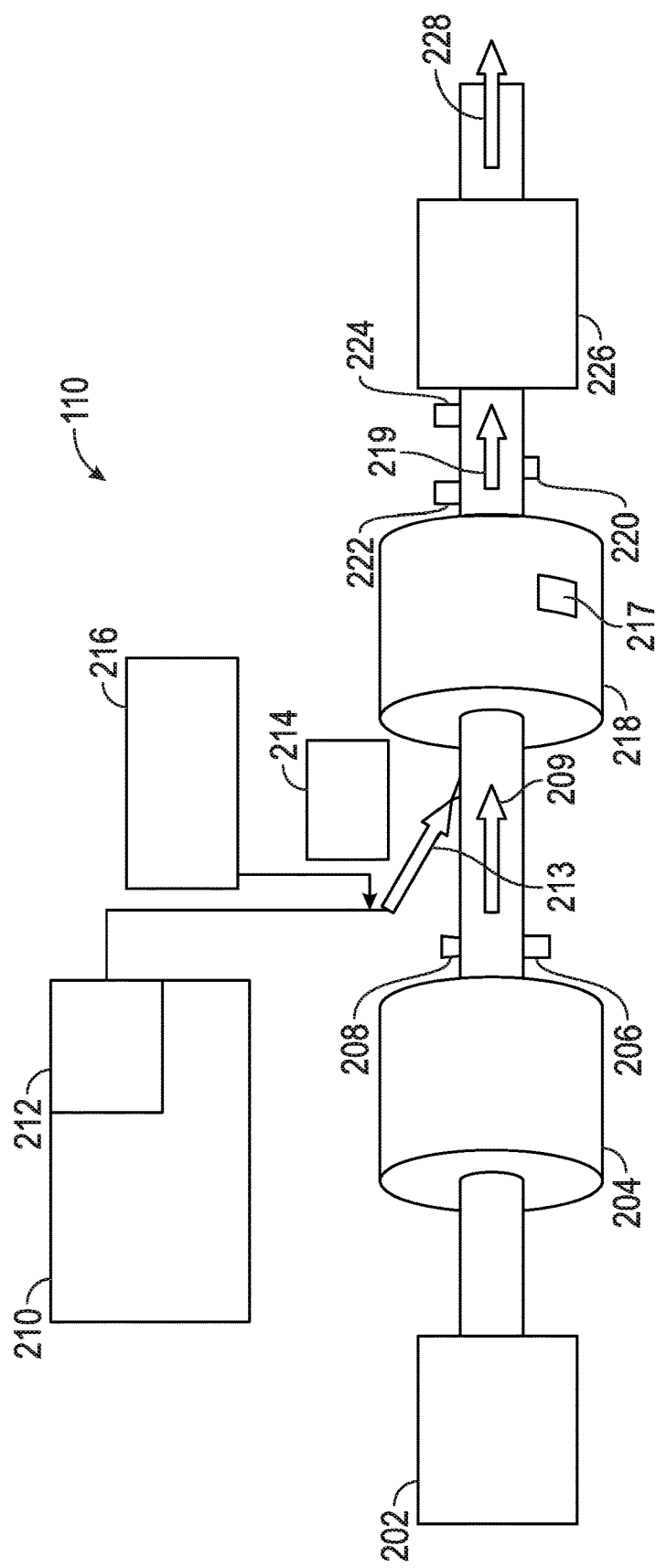
FIG. 2 is a functional block diagram of the propulsion system of FIG. 1, including the engine, the one or more nitrogen oxide sensors, the SCR unit, and the control system thereof, in accordance with an exemplary embodiment.

With reference to FIG. 2, a first level functional block diagram is provided for the propulsion system 110 of FIG. 1, in accordance with an exemplary embodiment. As depicted in FIG. 2, the propulsion system 110 includes an engine 202, a first oxidation catalyst unit 204, a first nitrogen oxide sensor 206, a first temperature sensor 208, a tank 210, a pump 212, a dosing module 214, a control system 216, a selective catalytic reduction (SCR) unit 218, a second nitrogen oxide sensor 220, a second temperature sensor 222, an ammonia ($NH_3$) sensor 224, and a second oxidation catalyst unit 226.

The engine 202 is utilized to propel the vehicle 100, for example by driving the wheels 106 via the axles 108. In one embodiment, the engine 202 comprises a diesel engine that runs on diesel fuel. However, this may vary in other embodiments.

The first oxidation catalyst unit 204 is coupled to the engine 202, and receives gas flow (e.g. exhaust air flow therefrom). In one embodiment in which the engine 202 comprises a diesel engine 202, the first oxidation catalyst unit 204 comprises a diesel oxidation catalyst (DOC) unit 204. In the depicted embodiment, the DOC unit 204 is disposed downstream of the engine 202, and converts nitrogen oxide (NO) to nitrogen dioxide ($NO_2$). It will be appreciated that in certain embodiments (e.g. in which the engine 202 may not be a diesel engine), then one or more other first catalyst units 204 may be utilized.

The first temperature sensor 208 measures a temperature of the gas flow from the first oxidation catalyst unit 204. The first nitrogen oxide sensor 206 measures a nitrogen oxide (e.g. NO or $NO_2$) concentration of the gas flow, for example from the first oxidation catalyst unit 204. In one embodiment, the first nitrogen oxide sensor 206 is located in or proximate an outlet of the engine. In another embodiment, the first nitrogen oxide sensor 206 is located in or proximate an outlet of the DOC unit 204. A more detailed schematic diagram of the first nitrogen oxide sensor 206 is depicted in FIG. 3, and is described further below in connection therewith. The gas flow from the first oxidation catalyst unit 204 is represented in FIG. 2 as gas flow 209, and flows toward the SCR unit 218.

As shown in FIG. 2, the gas flow 209, prior to reaching the SCR unit 218, is injected with a urea and/or an ammonia injection 213 from an ammonia or urea tank 210 via a pump 212, dosing module 214, and control system 216. Specifically, in one embodiment, the control system 216 (which in one embodiment includes a processor and a memory, discussed further below) includes instructions (stored in the memory, and provided and executed by the processor) for determining an appropriate amount of, and controlling the delivery of, the urea injection 213 (e.g. including $NH_3$, in one embodiment) from the tank 210 via the pump 212, and provides instructions for delivery of an appropriate amount of the ammonia injection 213 to the gas flow 209 via the dosing module 214. In one embodiment, the injection 213 initially comprises urea, or $CO(NH_2)$, and before the injection reaches the SCR catalyst, it has already decomposed to $NH_3$ (ammonia) and $CO_2$ (carbon dioxide) (e.g. due to temperatures that exceed two hundred degrees Celsius). Alternatively, in another embodiment, ammonia ($NH_3$) is directly injected into SCR. A more detailed schematic diagram of the control system 216 is depicted in FIG. 4, and is described further below in connection therewith.

Also in one embodiment, as discussed in greater detail further below in connection with the process 500 of FIG. 5, the control system 216 includes instructions for modulating the amount of the ammonia injection 213 based at least in part on an estimated ammonia slip level from the SCR unit 218. In addition, in one embodiment, the ammonia injection is executed by the control system 216 by a closed-loop control system. In one embodiment, based on the feedback from the sensor measurement of the delivery line pressure, a dosing control system regulates a speed of the pump 212 and an injector nozzle opening (not depicted) to inject the ammonia into gas flow 209.

While in the SCR unit 218, the gas flow (including exhaust gas originating from the engine 202) reacts with ammonia (e.g. $NH_3$) on a catalyst surface of the SCR unit 218 (e.g. as a result of the ammonia injection 213). This results in a desired reduction in nitrogen oxide ($NO_X$) concentration from the exhaust. As depicted in FIG. 2, an ammonia concentration model 217 is applied to the SCR unit 218 to estimate an ammonia coverage ratio of the catalyst on the surface of the SCR unit 218.

After exiting the SCR unit 218, continued gas flow 219 flows from the SCR unit 218 toward the second oxidation catalyst 226. In the depicted embodiment, a second nitrogen oxide sensor 220 measures a nitrogen oxide concentration of the continued gas flow 219. A more detailed schematic diagram of the second nitrogen oxide sensor 220 is depicted in FIG. 3, and is described further below in connection therewith. Also in the depicted embodiment, a second temperature sensor 222 measures a temperature of the continued gas flow 219 as it exits the SCR unit 218. In addition, as depicted in FIG. 2, one has an option to install an additional ammonia sensor 224 to measure an ammonia (e.g. $NH_3$) level of the continued gas flow 219. The second oxidation catalyst 228 further oxidizes the gas flow and removes residual ammonia from the exhaust flow, thereby resulting in final exhaust flow 228 that exits the second oxidation catalyst 228 and that ultimately exits the vehicle 100.

Figure 3:
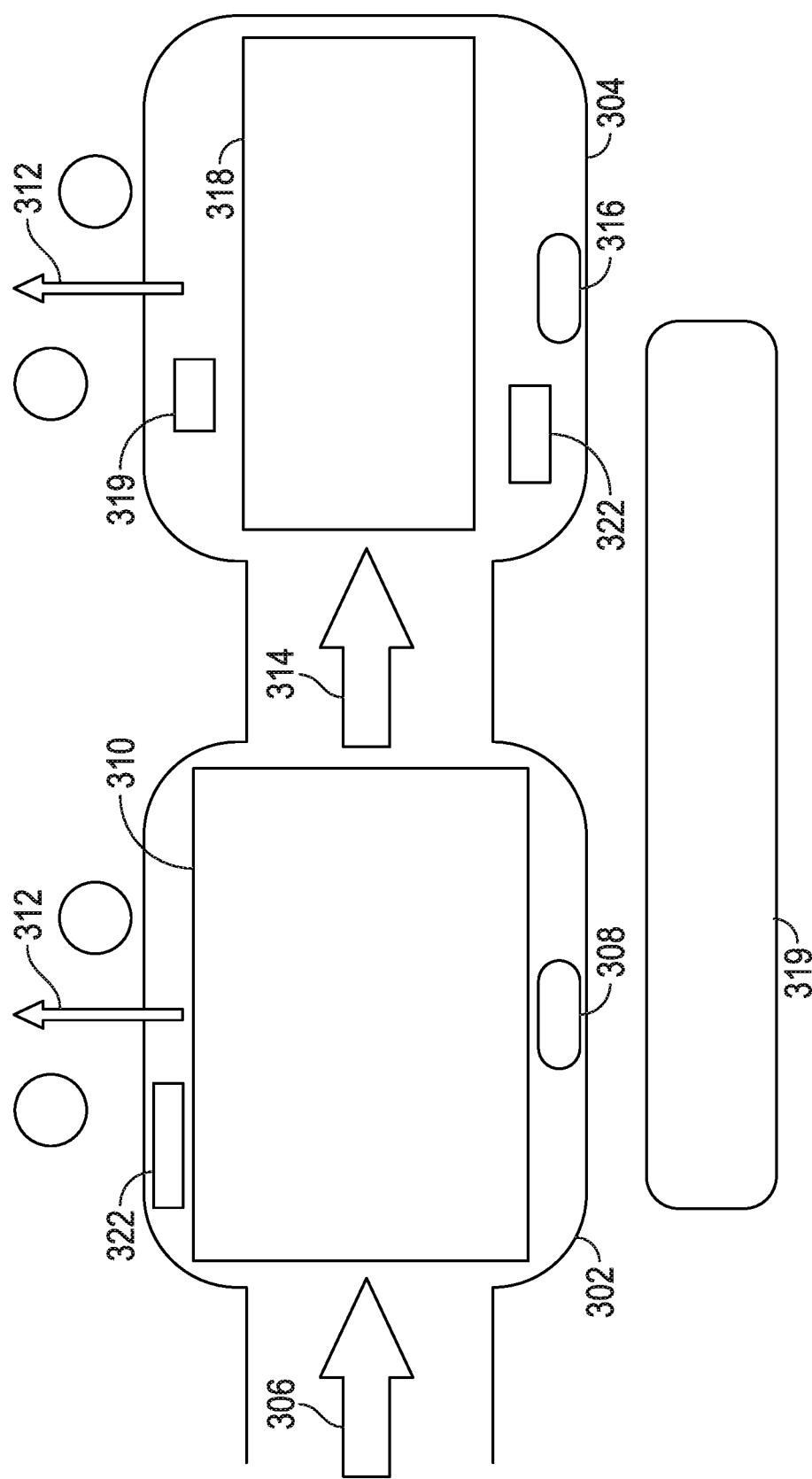
FIG. 3 is a schematic diagram of one of the nitrogen oxide sensors of FIGS. 1 and 2, in accordance with an exemplary embodiment.

With reference to FIG. 3, a schematic diagram is provided for a nitrogen oxide sensor of the propulsion system 110 of FIGS. 1 and 2 (e.g. the first nitrogen oxide sensor 206 and/or the second nitrogen oxide sensor 220). In one particular embodiment, FIG. 3 pertains to the second nitrogen oxide sensor 220. In the depicted embodiment, the nitrogen oxide sensor 206, 220 includes a first chamber 302 and a second chamber 304. A first gas flow 306 enters the first chamber 302, either directly or indirectly from the engine 202. For example, in the case of the first nitrogen oxide sensor 206 of FIG. 2, the first gas flow 306 is part of the gas flow path 209 of FIG. 2, downstream of the engine 202 (and that includes exhaust that originated from the engine 202). In the case of the second nitrogen oxide sensor 220, the first gas flow 306 is part of the continued gas flow 219 of FIG. 2 (and that also includes exhaust that originated from the engine 202).

In the first chamber 302, a first sequence 308 occurs, including various reactions 310 and resulting oxygen ($O_2$) pumping 312 out of the nitrogen oxide sensor 206, 220. Specifically, in one embodiment, the reactions 310 of the first chamber 302 include chemical reactions from $NO_2$ to NO and from CO, HC, $H_2$ to $CO_2$, $H_2O$. Also in one embodiment, the reactions 310 of the first chamber 302 also include non-chemical reactions of $N_2$, $CO_2$, $H_2O$. In one embodiment, the non-chemical reaction refers to no further chemical reaction involved, for example because $N_2$, $CO_2$, and $H_2O$ are the most stable compounds.

A continued gas flow 314, resulting from the first sequence 308, flows from the first chamber 302 to the second chamber 304. Also as depicted in FIG. 3, in the second chamber 304, a second sequence 316 occurs, including various reactions 318 and resulting oxygen ($O_2$) pumping 320 out of the nitrogen oxide sensor 206, 220. Specifically, in one embodiment, the reactions 318 of the second chamber 304 include the main chemical reaction (denoted in FIG. 3 as reaction 319) $NO \leftrightarrow \frac{1}{2} N_2 + \frac{1}{2} O_2$. In one embodiment, a circuit 319 is disposed inside the second chamber 304, and measures a concentration of oxygen ($O_2$) pumped out from the second chamber 304, which is proportional to the NO in the second chamber, therefore NOx is measured.

Also as depicted in FIG. 3, the nitrogen oxide sensor 206, 220 includes one or more heaters 322, which heats the chamber temperature up to 700 C.

Figure 4:
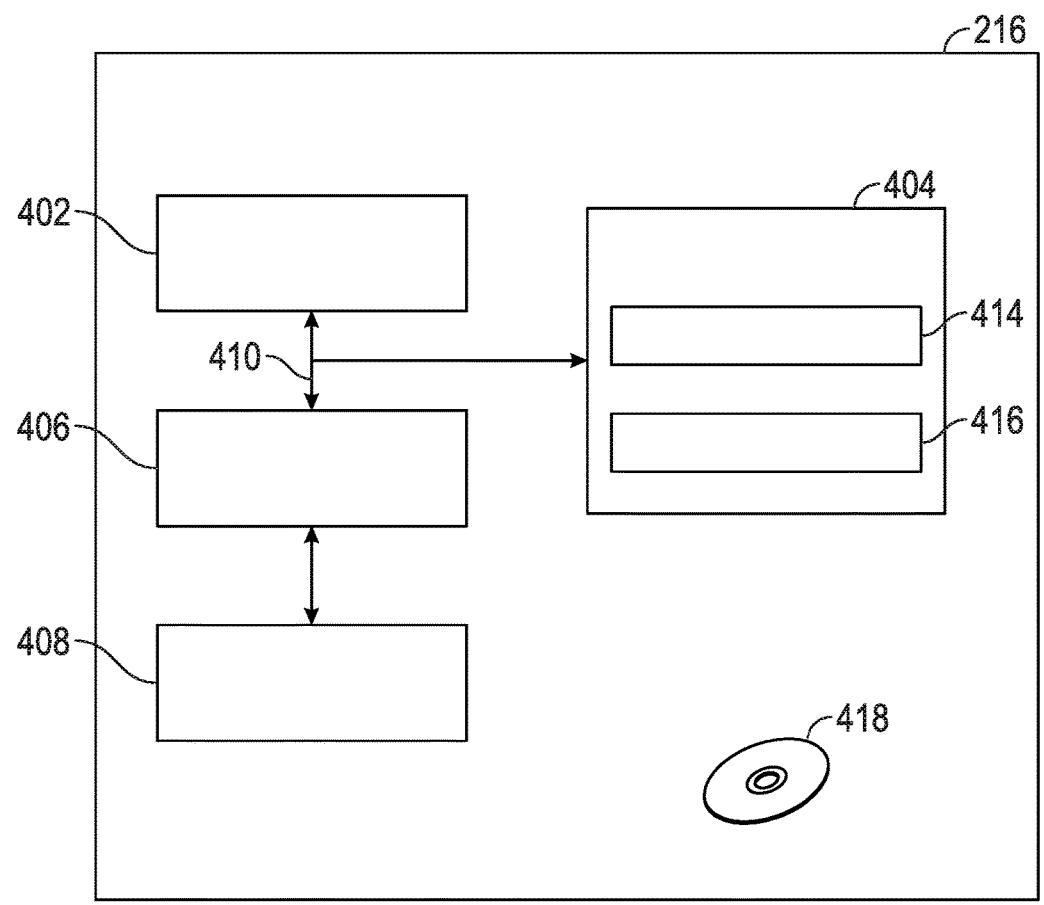
FIG. 4 is a functional block diagram of the control system of FIGS. 1 and 2, in accordance with an exemplary embodiment.

With reference to FIG. 4, a more detailed functional block diagram is provided for the control system 216 of FIGS. 1 and 2, in accordance with an exemplary embodiment. As depicted in FIG. 4, the control system 216 comprises a computer system. In certain embodiments, the control system 216 may also include one or more of the sensors and/or other components of the propulsion system 110, one or more other devices and/or systems, and/or components thereof.

In the depicted embodiment, the computer system of the control system 216 includes a processor 402, a memory 404, an interface 406, a storage device 408, and a bus 410. The processor 402 performs the computation and control functions of the control system 216, and may comprise any type of processor or multiple processors, single integrated circuits such as a microprocessor, or any suitable number of integrated circuit devices and/or circuit boards working in cooperation to accomplish the functions of a processing unit. During operation, the processor 402 executes one or more programs contained within the memory 404 and, as such, controls the general operation of the control system 216 and the computer system of the control system 216, generally in executing the processes described herein, such as those described further below in connection with FIG. 5.

The memory 404 can be any type of suitable memory. For example, the memory 404 may include various types of dynamic random access memory (DRAM) such as SDRAM, the various types of static RAM (SRAM), and the various types of non-volatile memory (PROM, EPROM, and flash). In certain examples, the memory 404 is located on and/or co-located on the same computer chip as the processor 402. In the depicted embodiment, the memory 404 stores the above-referenced program 414 along with one or more stored values 416 (e.g. one or more kinetic models for the propulsion system 110).

The bus 410 serves to transmit programs, data, status and other information or signals between the various components of the computer system of the control system 216. The interface 406 allows communication to the computer system of the control system 216, for example from a system driver and/or another computer system, and can be implemented using any suitable method and apparatus. In one embodiment, the interface 406 obtains the various data from the sensors of the propulsion system 110. The interface 406 can include one or more network interfaces to communicate with other systems or components. The interface 406 may also include one or more network interfaces to communicate with technicians, and/or one or more storage interfaces to connect to storage apparatuses, such as the storage device 408.

The storage device 408 can be any suitable type of storage apparatus, including direct access storage devices such as hard disk drives, flash systems, floppy disk drives and optical disk drives. In one exemplary embodiment, the storage device 408 comprises a program product from which memory 404 can receive a program 414 that executes one or more embodiments of one or more processes of the present disclosure, such as the steps described further below in connection with FIG. 5. In another exemplary embodiment, the program product may be directly stored in and/or otherwise accessed by the memory 404 and/or a disk (e.g., disk 418), such as that referenced below.

The bus 410 can be any suitable physical or logical means of connecting computer systems and components. This includes, but is not limited to, direct hard-wired connections, fiber optics, infrared and wireless bus technologies. During operation, the program 414 is stored in the memory 404 and executed by the processor 402.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 402) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the control system 216 may also otherwise differ from the embodiment depicted in FIG. 4, for example in that the computer system of the control system 216 may be coupled to or may otherwise utilize one or more remote computer systems and/or other systems.

Figure 5:
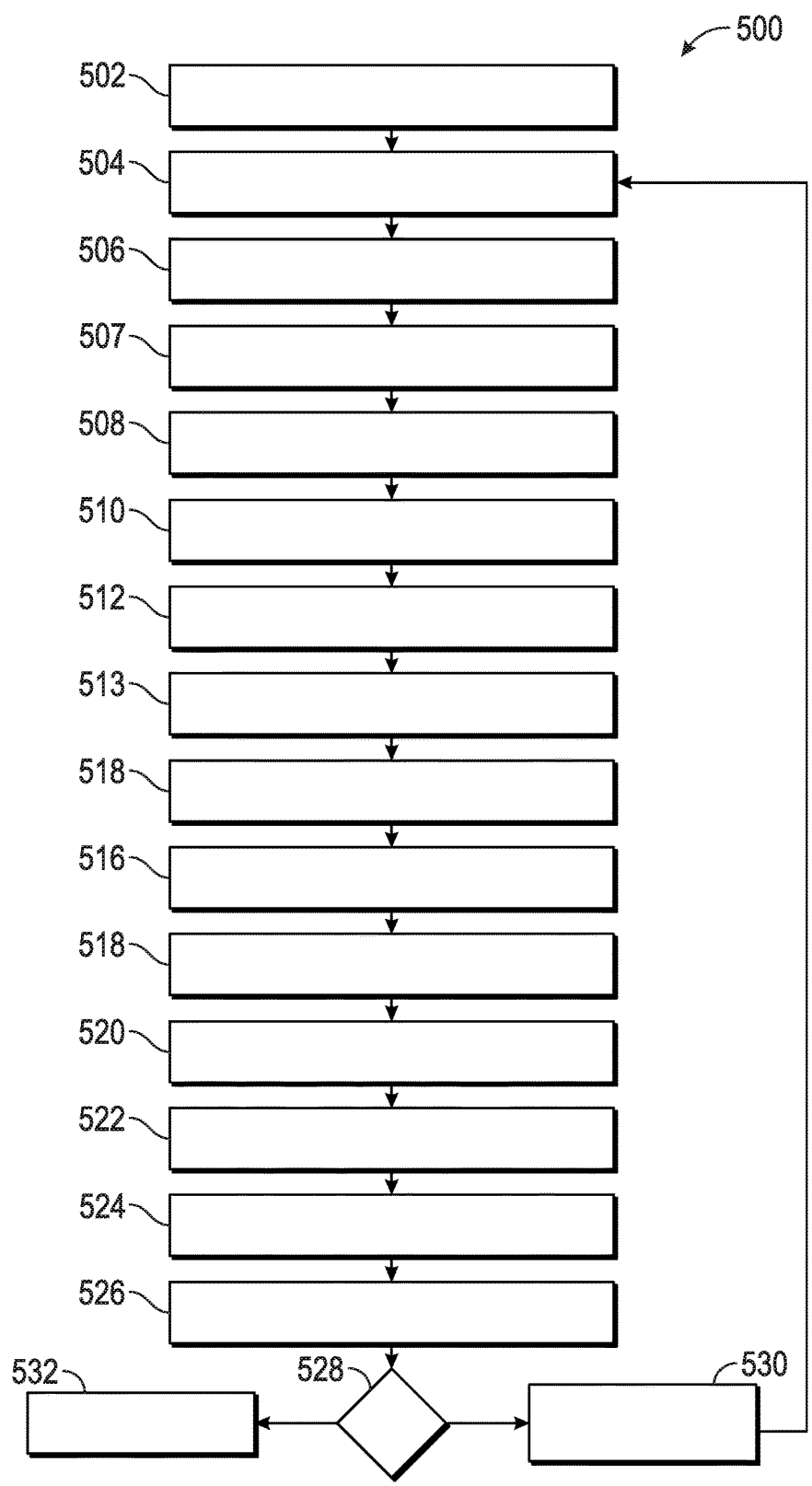
FIG. 5 is a flowchart of a process for estimating an updated value for an initial nitrogen oxide measurement of a nitrogen oxide sensor, and that can be utilized in connection with the vehicle of FIG. 1, the propulsion system of FIGS. 1 and 2, the nitrogen oxide sensors of FIGS. 2 and 3, and the control system of FIGS. 2 and 4, in accordance with an exemplary embodiment.

With reference to FIG. 5, a flowchart is provided for a process 500 for estimating an updated value for an initial nitrogen oxide measurement of a nitrogen oxide sensor, in accordance with an exemplary embodiment. In one embodiment, the process 500 is implemented in connection with the vehicle 100 of FIG. 1, the propulsion system 110 of FIGS. 1 and 2, the nitrogen oxide sensors 206 and/or 220 of FIGS. 2 and 3, and the control system 216 of FIGS. 2 and 4.

As depicted in FIG. 5, the process 500 begins at 502. In one embodiment, the process 500 begins when a vehicle is in operation, for example, when the propulsion system 110 of the vehicle 100 is activated or turned on, and/or when the vehicle 100 is in a "drive mode", moves along a path or roadway, and/or is ready for movement along a desired path.

At 504, one or more initial nitrogen oxide measurements are obtained. In various embodiments, the initial nitrogen oxide measurements are measured by one or both of the nitrogen oxide sensors 206, 220 of FIGS. 2 and 3, and are provided to the processor 402 of the control system 216 of FIG. 4. In one embodiment, the measurements are obtained via the second nitrogen oxide sensor 220. As set forth further below, in various embodiments the initial measurement(s) of step 504 are subsequently updated via the process 500, for example to account for ammonia slip for the SCR unit 218, using various other parameter values and one or more kinetic models (as discussed below).

At 506, one or more nitrogen oxide sensor temperatures are estimated from the temperature sensors 222 in FIG. 2, and are provided to the processor 402 of the control system 216 of FIG. 4.

At 508, a flow rate is obtained for one or more nitrogen oxide sensors. In various embodiments, the flow rates are measured for one or both of the nitrogen oxide sensors 206, 220 by measuring engine exhaust flow rate 209 in FIG. 2, and are provided to the processor 402 of the control system 216 of FIG. 4. In one embodiment, the flow rate are measured for the second nitrogen oxide sensor 220 by measuring engine exhaust flow rate 209 in FIG. 2, and is provided to the processor 402 of the control system 216 of FIG. 4.

At 510, one or more SCR temperatures are obtained. In various embodiments, the SCR temperatures are measured for the SCR unit 218 of FIG. 2 by the second temperature sensor 222 that is disposed within or proximate the continued gas flow 219 from the SCR unit 218, and are provided to the processor 402 of the control system 216 of FIG. 4.

In certain embodiments, at 512, one or more catalyst input values are obtained. In various embodiments, the catalyst input values are obtained via the control system 216 and/or the dosing module 214 of FIG. 2 with respect to an amount or concentration of catalyst (e.g. ammonia, or $NH_3$) that are injected into the exhaust gas flow via the ammonia injection 213, and are provided to the processor 402 of the control system 216 of FIG. 4.

Also in certain embodiments, at 513, an ammonia coverage ratio is obtained. In one embodiment, the ammonia coverage ratio is estimated via the ammonia concentration model 217 of FIG. 2, and comprises a coverage ratio of ammonia (e.g. NH3) on a surface of the SCR unit 218. Also in one embodiment, the ammonia coverage ratio is provided to the processor 402 of the control system 216 of FIG. 4.

In addition, in certain embodiments, at 514, one or more ammonia (e.g. $NH_3$) slip values are obtained. In various embodiments, the ammonia slip values are either estimated or measured by the ammonia sensor 224 of FIG. 2, and pertain to an amount of ammonia slip via the SCR unit 218 of FIG. 2.

In certain embodiments, at 516, one or more nitrogen oxide sensor kinetic models are obtained. In various embodiments, the nitrogen oxide sensor kinetic models are stored in the memory 404 of FIG. 4 as stored values 416 therein, and are retrieved at 516 by the processor 402 of FIG. 4. Also in various embodiments, the one or more nitrogen oxide sensor kinetic models comprise reaction models that include the reactions 310, 318 discussed above in connection with FIG. 3, along with various equations, including: a first order $NO_X$ sensor kinetic equation, namely:

$$\dot{C}_{NOx,sen} = Q_{sen}C_{NOx} - Q_{sen}C_{NOx,sen} + ke^{-\frac{E}{T}}C_{NH3}C_{O2}$$

a steady state response, namely:

$$C_{NOx,sen} = C_{NOx} + k\frac{1}{Q_{sen}}e^{-\frac{E}{T}}C_{NH3} = C_{NOx} + k(T)\frac{1}{Q_{sen}}e^{-\frac{E}{T}}C_{NH3}$$

Or in polynomial expansion:

$$C_{NOx,sen} = C_{NOx} + a_1 C_{NH3} \cdot T + a_2 C_{NH3} \cdot T^2 + a_3 C_{NH3} \cdot T^2 \frac{1}{Q_{sen}}$$

and a NOx sensor gas temperature equation, namely:

$$T(sen\_gas)=T_{SCR\_gas})=T_{SCR\_gas}+h(973-T_{SCR\_gas}),$$

in which $Q_{sen}$ represents a flow velocity of the nitrogen oxide sensor, T represents a temperature of gas flow in the nitrogen oxide sensor, C represents a concentration value for various parameters (e.g. $NH_3$ and $NO_X$), h is equal to a sensor convection rate (e.g. consistent with an NOX sensor heating temperature of 700 degrees Celsius), E represents an activation energy, and k is equal to a known coefficient as a function of temperature. Accordingly, in one embodiment, the nitrogen oxide sensor model comprises a dynamic, physics-based, non-linear, reaction model that rapidly changes with both temperature and exhaust flow rate, and therefore changes very quickly in a dynamic manner in according with such conditions, thereby potentially provided more accurate and/or more rapid results as compared with existing models (e.g. as compared with a linear, static model).

In addition, in certain embodiments, at 518, one or more SCR kinetic models are obtained. In various embodiments, the SCR kinetic models are stored in the memory 404 of FIG. 4 as stored values 416 therein, and are retrieved at 518 by the processor 402 of FIG. 4. Also in various embodiments, the one or more SCR models included various equations, including the following:

$$\dot{x}_1=-Qx_1-r_{red\_1}C_{O2}\Theta\theta x_1-r_{red\_2}\Theta C_{NOx}x_2+QC_{XOx,in}$$

$$\dot{x}_2=-(r_{red}C_{NOx}C_{O2}+r_{ox}+r_{de})x_2+r_{ad}(1-\theta)x_3$$

$$\dot{x}_3=-Qx_3-r_{de}\Theta+(r_{de}\Theta+r_{ad}\Theta C_{NH3})x_2+QC_{NH3,in}$$

$$\dot{x}_4=-Q_{sen}x_4+Q_{sen}x_1+f(T,Q_{sen})e^{(-E/T)}x_3$$

$$y_{NOx\_sen}=VQ_{sen}\cdot M_{NOx}x_4$$

Or simplified model $$\dot{x}_1=-Qx_1-r_{red\_1}C_{O2}\Theta\theta x_1-r_{red\_2}\Theta C_{NOx}x_2+QC_{XOx,in}$$

$$\dot{x}_2=-(r_{red}C_{NOx}C_{O2}+r_{ox}+r_{de})x_2+r_{ad}(1-\theta)x_3$$

$$\dot{x}_3=-Qx_3-r_{ad}\Theta+(r_{de}\Theta+r_{ad}\Theta C_{NH3})x_2+QC_{NH3,in}$$

$$y_{NOx\_sen}=x_1+f(T,Q_{sen})e^{(-E/T)}x_3$$

in which $Q_{sen}$ represents a flow velocity of the nitrogen oxides, T represents a temperature of the NOx sensor C represents a concentration value for various parameters (e.g. $NH_3$ and $NO_X$), E represents an activation energy, and θ represents a coverage ratio for a surface by the ammonia. The state variables $x_1$ represents NOx concentration, $x_2$ represents ammonia coverage ratio on the catalyst, $x_3$ represents NH3 concentration, $x_4$ represents NOx concentration $\dot{x}_1$, $\dot{x}_2$, $\dot{x}_3$, $\dot{x}_4$ are derivatives of the state variables. The response rate of the state $x_1$ and $x_3$ are far faster than that of $x_2$. Therefore, for simplicity in the above equation, the derivatives of $x_1$ and $x_3$ can also be set to zero, their corresponding equations become the algebraic equations. $r_{red}$ is the catalyst NOx reduction rate, which is a function of temperature T, $r_{ox}$ is the ammonia oxidation rate, $r_{ad}$, is the ammonia adsorption rate, $r_{de}$, is the ammonia desorption rate, V is the catalyst volume, $M_{NOx}$ is the molecular weight of NOx, Ω is the catalyst maximum capacity that can store ammonia, θ is the ammonia coverage ratio, which is equivalent to $x_2$. There are different methods to model SCR catalyst, for example, NOx can alos be modeled as two separate equations based NO and NO2, or instead of differential equations, the SCR model can be modeled as difference equations. Any SCR kinetic model that have multiple bricks (i.e, an SCR system is divided into several seriesly connnected subsystems) can be combined with the NOx sensor kinetic model to form a complete set of equations descrbing both SCR and NOx sensor dynamics in order to construct a Kalman filter to estimate their state variables.

Also in certain embodiments, at 520, the nitrogen oxide sensor kinetic model and the SCR kinetic model are combined to construct an extended or nonlinear Kalman filter to estimate all state variables, the Kalman filter does not depend on the initial value of ammonia coverage ratio, which is usually not known precisely. In one embodiment, the Kalman filter is stored in the memory 404 of FIG. 4 as one or more stored values 416 thereof, and are retrieved via the processor 402 of FIG. 4 at 520. In various embodiments, the Kalman filter utilizes, as inputs, ammonia input values of step 512 (e.g. the amount of ammonia injected into the gas flow 209 prior to entering the SCR unit 218), along with each of the flow rate, the first temperature, and the second temperature and engine out NOx as additional inputs. Also in one embodiment, the nitrogen oxide sensor temperature of 506, the flow rate of 508, and the SCR temperature of 510 are used, along with other parameters, as inputs into the Kalman filter. In addition, in one embodiment, the results of the Kalman filter include the following estimated states:

$\hat{x}_1$: estimated actual SCR out NOx
$\hat{x}_2$: ammonia coverage ratio
$\hat{x}_3$: estimated ammonia slip
$\hat{x}_4$: NOx sensor measurement Specifically, in one embodiment, the parameters of the Kalman filter include an actual nitrogen oxide concentration, an ammonia coverage ratio (e.g. from 513), an estimated ammonia slip from the SCR unit 218 (e.g. from 514), and an initial nitrogen oxide measurement (e.g. from 504).

At 522, the result of the first Kalman filter state, namely the actual nitrogen oxide concentration, is adopted as an updated value of the initial nitrogen oxide concentration value of 504. In various embodiments, the updated nitrogen oxide concentration vale of 504 is utilized by the control system 216 of FIGS. 2 and 4 (including the processor 402 thereof of FIG. 4) for operation of the propulsion system 110.

In certain embodiments, an updated nitrogen oxide concentration value is estimated or updated by using one or more alternate approaches at 524 when an additional NH3 sensor 224 in FIG. 2 is available to measure the amount of NH3 slipped from the SCR catalyst. In certain embodiments, measured ammonia concentration slip 224 for the SCR unit 218 of FIG. 2 is used as the NH3 value input to 514, via the processor 402 of the control system 216 of FIG. 4.

In one such embodiment of 524, a sliding mode observer model is used, in accordance with the following equations:

$$\dot{y} = -Qy + ke^{-\frac{E}{T}}C_{NH3}C_{O2} + Qm(C_{NOx,sen})\text{sign}(C_{NOx,sen} - y)$$

$$C_{NOx} = m(C_{NOx,sen})\text{sign}(C_{NOx,sen} - y)$$

in which Q represents a flow velocity, T represents a temperature of gas flow in the nitrogen oxide sensor, C represents a concentration value for various parameters (e.g. $O_2$ and $NO_x$), and E represents an activation energy. k is the function of the temperature T, m is the observer gain, which can be calibrated as a function of NOx sensor measurement, sign(*) is the sign function, which equals one if the variable inside the sign is greater or equal to one, otherwise, equals to negative one. y is the observer state.

In another embodiment of 524, a feedback linearization model is used, in accordance with the following equations:

$$\dot{y} = -Qy + ke^{-\frac{E}{T}}C_{NH3}C_{O2} + Q\hat{C}_{NOx}$$

$$Q\hat{C}_{NOx} = Qy - ke^{-\frac{E}{T}}C_{NH3}C_{O2} + k_1(C_{NOx,sen} - y) + k_2\int(C_{NOx,sen} - y) + \dot{C}_{NOx,sen}$$

in which Q represents a flow velocity of the nitrogen oxide sensor, T represents a temperature of gas flow in the nitrogen oxide sensor, C represents a concentration value for various parameters (e.g. $O_2$, $NH_3$ and $NO_x$), and E represents an activation energy. k is the function of the temperature T, $k_1$ and $k_2$ are proportional and integration gains of the observer.

In addition, an ammonia slip value is determined at 526. In various embodiments, the ammonia slip value is determined at 526 via the processor 402 of the control system 216 of FIG. 4 based on the initial nitrogen oxide concentration measurement of 504 and the updated or adjusted nitrogen oxide value at 524 or 526 (depending upon the model(s) utilized). In one such embodiment, an ammonia slip value represents an amount of ammonia slippage via the SCR unit 218 of FIG. 2, and is estimated via the processor 402 as a difference between the initial nitrogen oxide measurement of 504 and the adjusted nitrogen oxide measurement of 524 or 526.

At 528, a determination is made as to whether the ammonia slip of 526 is greater than a predetermined threshold, for example 10 ppm. In one embodiment, this determination is made by the processor 402 of the control system 216 of FIG. 4.

If it is determined that the ammonia slip of 526 is greater than the predetermined threshold, then the ammonia injection is adjusted at 530. Specifically, in one embodiment, at 530 the control system 216 of FIG. 2 (e.g. the processor 402 thereof of FIG. 4) reduces the ammonia injection 213 of FIG. 2 via the dosing module 214 of FIG. 2, to account for the excess ammonia slip. In one embodiment, the ammonia injection 213 reduction is performed, either in a single iteration or in multiple iterations, until the ammonia slip of 526 is less than the predetermined threshold of 526. Conversely, if the ammonia slip of 526 is less than or equal to the predetermined threshold of 526, then the process terminates at 532 in certain embodiments (or returns again to 504 in a new iteration in other embodiments).

Accordingly, methods, systems, and vehicles are provided that generate updated nitrogen oxide sensor measurements for vehicle propulsion systems. In various embodiments, the updated measurements account for ammonia slip in an SCR unit of the vehicle. In addition, in certain embodiments, an amount of ammonia injection for the SCR unit is adjusted to offset the ammonia slip.

It will be appreciated that the disclosed methods, systems, and vehicles may vary from those depicted in the Figures and described herein. For example, the vehicle 100, the propulsion system 110, and/or various components thereof may vary from that depicted in FIGS. 1-4 and described in connection therewith. It will similarly be appreciated that the process 500 may differ from that depicted in FIG. 5, and/or that one or more steps may occur simultaneously or in a different order than depicted in FIG. 5, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   obtaining a nitrogen oxides concentration value pertaining to a selective catalytic reduction (SCR) unit of a propulsion system for a vehicle, via a processor;
   using the nitrogen oxides concentration value as a first input for a kinetic model of the SCR unit that is stored in a memory, generating an SCR kinetic model output from the kinetic model of the SCR unit, via a processor;
   measuring an initial nitrogen oxide concentration measurement via a nitrogen oxide sensor that is coupled to the SCR unit, an engine of the propulsion system, or both;
   using the nitrogen oxides concentration value as a second input for a reaction model of the nitrogen oxide sensor that is stored in the memory, generating a nitrogen oxide sensor reaction model output from the kinetic model of the nitrogen oxide sensor, via the processor; and
   estimating an updated value for the initial nitrogen oxide measurement, via the processor, based on both the SCR kinetic model output and the nitrogen oxide sensor reaction model output;
   wherein the step of estimating the updated value comprises estimating an ammonia slip for the SCR unit and the method further comprises:
   determining whether the ammonia slip is greater than a predetermined threshold; and
   decreasing an amount of urea injected into the SCR unit, via the processor, if the ammonia slip is greater than the predetermined threshold.

2. The method of claim 1, wherein the nitrogen oxide sensor reaction model comprises a dynamic, physics-based, non-linear, reaction model that is dependent on temperature and exhaust flow rate.

3. The method of claim 1, wherein:
   the step of obtaining the nitrogen oxides concentration value comprises obtaining a urea injection value pertaining to an amount of urea injected into the SCR unit;
   the step of using the nitrogen oxides concentration value comprises using the urea injection value as an input for a Kalman filter of the one or more kinetic models, via the processor, generating a Kalman filter output; and
   the step of estimating the updated value comprises estimating the updated value for the initial nitrogen oxide measurement, via the processor, based on the Kalman filter output.

4. The method of claim 3, further comprising:
   measuring a flow rate for the nitrogen oxide sensor;
   measuring a first temperature of the nitrogen oxide sensor; and
   measuring a second temperature of the SCR unit;
   wherein step of using the nitrogen oxides concentration value comprises using the urea injection value along with the flow rate, the first temperature, and the second temperature, as inputs for the Kalman filter of the one or more kinetic models, via the processor, generating the Kalman filter output; and
   wherein the updated value for the initial nitrogen oxide measurement is estimated, via the processor, based on the Kalman filter output that uses each of the flow rate, the first temperature, and the second temperature as inputs.

5. The method of claim 1, wherein:
   the step of obtaining the nitrogen oxides concentration value comprises obtaining an ammonia concentration value from the SCR unit;
   the step of using the nitrogen oxides concentration value comprises using the ammonia concentration value as an input for a sliding mode observer kinetic model, via the processor, generating a sliding mode observer kinetic model output; and
   the step of estimating the updated value comprises estimating the updated value for the initial nitrogen oxide measurement, via the processor, based on the sliding mode observer kinetic model output.

6. The method of claim 1, wherein:
   the step of obtaining the nitrogen oxides concentration value comprises obtaining an ammonia concentration value from the SCR unit;
   the step of using the nitrogen oxides concentration value comprises using the ammonia concentration value as an input for a feedback linearization observer kinetic model, via the processor, generating a feedback linearization observer kinetic model output; and
   the step of estimating the updated value comprises estimating the updated value for the initial nitrogen oxide measurement, via the processor, based on the feedback linearization observer kinetic model output.

7. A system comprising:
   a nitrogen oxide sensor coupled to an engine, a selective catalytic reduction (SCR) unit, or both, of a propulsion system for a vehicle, the nitrogen oxide sensor configured to generate in initial nitrogen oxide measurement;
   a memory configured to store a kinetic model of the SCR unit and a reaction model of the nitrogen oxide sensor; and
   a processor configured to at least facilitate:
   obtaining a nitrogen oxides concentration value pertaining to a selective catalytic reduction (SCR) unit of the propulsion system;
   obtaining the initial nitrogen oxide concentration measurement via the nitrogen oxide sensor of the propulsion system;
   using the nitrogen oxides concentration value as a first input for the kinetic model of the SCR unit stored in the memory, generating an SCR kinetic model output from the kinetic model of the SCR unit;
   using the nitrogen oxides concentration value as a second input for the reaction model of the nitrogen oxide sensor, generating a nitrogen oxide sensor reaction model output from the kinetic model of the nitrogen oxide sensor; and
   estimating an updated value for the initial nitrogen oxide measurement based on both the SCR kinetic model output and the nitrogen oxide sensor reaction model output.

8. The system of claim 7, wherein the nitrogen oxide sensor reaction model comprises a dynamic, physics-based, non-linear, reaction model that is dependent on temperature and exhaust flow rate.

9. The system of claim 7, wherein the processor is configured to at least facilitate:
obtaining a urea injection value pertaining to an amount of urea injected into the SCR unit;
using the urea injection value as an input for a Kalman filter of the one or more kinetic models, generating a Kalman filter output; and
estimating the updated value for the initial nitrogen oxide concentration measurement based on the Kalman filter output.

10. The system of claim 9, further comprising:
a first sensor configured to measure a flow rate for the nitrogen oxide sensor;
a second sensor configured to measure temperature of the first nitrogen oxide sensor; and
a third sensor configured to measure a second temperature of the SCR unit;
wherein the processor is configured to at least facilitate using the urea injection value along with the flow rate, the first temperature, and the second temperature, as inputs for the Kalman filter of the one or more kinetic models, generating the Kalman filter output; and
estimating the updated value for the initial nitrogen oxide concentration measurement based on the Kalman filter output that uses each of the flow rate, the first temperature, and the second temperature as inputs.

11. The system of claim 7, wherein the processor is configured to at least facilitate:
obtaining an ammonia concentration value from the SCR unit;
using the ammonia concentration value as an input for a sliding mode observer kinetic model, generating a sliding mode observer kinetic model output; and
estimating the updated value for the initial nitrogen oxide measurement, via the processor based on the sliding mode observer kinetic model output.

12. The system of claim 7, wherein the processor is configured to at least facilitate:
obtaining an ammonia concentration value from the SCR unit;
using the ammonia concentration value as an input for a feedback linearization observer kinetic model, generating a feedback linearization observer kinetic model output; and
estimating the updated value for the initial nitrogen oxide measurement based on the feedback linearization observer kinetic model output.

13. The system of claim 7, wherein the processor is configured to at least facilitate:
estimating an ammonia slip for the SCR unit based on the kinetic model output;
determining whether the ammonia slip is greater than a predetermined threshold; and
decreasing an amount of urea injected into the SCR unit, via the processor, if the ammonia slip is greater than the predetermined threshold.

14. A vehicle comprising:
an engine;
a selective catalytic reduction system (SCR) unit coupled to the engine;
a nitrogen oxide sensor coupled to the engine, the SCR unit, or both, the nitrogen oxide sensor configured to generate in initial nitrogen oxide measurement;
a memory configured to store a kinetic model of the SCR unit and a reaction model of the nitrogen oxide sensor; and
a processor configured to at least facilitate:
obtaining a nitrogen oxides concentration value pertaining to the (SCR) unit;
using the nitrogen oxides concentration value as a first input for the kinetic model of the SCR unit, stored in the memory, generating an SCR kinetic model output from the kinetic model of the SCR unit;
using the nitrogen oxides concentration value as a second input for the reaction model of the nitrogen oxide sensor, generating a nitrogen oxide sensor reaction model output from the kinetic model of the nitrogen oxide sensor; and
estimating an updated value for the initial nitrogen oxide measurement based on both the SCR kinetic model output and the nitrogen oxide sensor reaction model output.

\* \* \* \* \*